(12) United States Patent
He et al.

(10) Patent No.: US 12,230,821 B2
(45) Date of Patent: Feb. 18, 2025

(54) BATTERY PACK AND ELECTRIC VEHICLE

(71) Applicant: BYD COMPANY LIMITED, Guangdong (CN)

(72) Inventors: Long He, Shenzhen (CN); Huajun Sun, Shenzhen (CN); Yan Zhu, Shenzhen (CN); Liangwen Tan, Shenzhen (CN); Long Wan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 403 days.

(21) Appl. No.: 17/777,938

(22) PCT Filed: Oct. 22, 2020

(86) PCT No.: PCT/CN2020/122891
§ 371 (c)(1),
(2) Date: May 18, 2022

(87) PCT Pub. No.: WO2021/098440
PCT Pub. Date: May 27, 2021

(65) Prior Publication Data
US 2022/0416343 A1 Dec. 29, 2022

(30) Foreign Application Priority Data
Nov. 18, 2019 (CN) .......................... 201911129785.1

(51) Int. Cl.
*H01M 50/209* (2021.01)
*B60L 50/64* (2019.01)
(Continued)

(52) U.S. Cl.
CPC ........... *H01M 50/209* (2021.01); *B60L 50/64* (2019.02); *H01M 10/613* (2015.04);
(Continued)

(58) Field of Classification Search
CPC ............. H01M 10/613; H01M 10/625; H01M 10/6555; H01M 50/209; H01M 50/264; H01M 50/291; Y02E 60/10
See application file for complete search history.

(56) References Cited

U.S. PATENT DOCUMENTS

| 10,615,385 B2 | 4/2020 | Takahashi et al. |
| 2006/0134514 A1 | 6/2006 | Lenain et al. |

(Continued)

FOREIGN PATENT DOCUMENTS

| CN | 1328705 A | 12/2001 |
| CN | 201927662 U | 8/2011 |

(Continued)

OTHER PUBLICATIONS

International Search Report and Written Opinion for Application No. PCT/CN2020/122891, mailed on Jan. 29, 2021, 13 pages.
(Continued)

*Primary Examiner* — Kevin E Yoon

(57) ABSTRACT

A battery pack includes a housing having a bottom surface and a top surface and a battery assembly in the housing. The battery assembly includes structural reinforcing members and cell sequences formed by connecting multiple cells. An outer surface of the cell includes a bottom surface, a top surface, first and second lateral surfaces. The bottom surface of the cell faces the bottom surface of the housing, and the top surface of the cell faces the top surface of the housing. The first lateral surface has a largest area. The multiple cells are arranged with second lateral surfaces thereof facing each other to form a cell sequence, and the structural reinforcing members are fixedly bonded with first lateral surfaces of cells in the cell sequence. The battery assembly is supported in the housing by the bottom surface of the housing.

28 Claims, 7 Drawing Sheets

(51) Int. Cl.
  *H01M 10/613* (2014.01)
  *H01M 10/625* (2014.01)
  *H01M 10/6555* (2014.01)
  *H01M 50/218* (2021.01)
  *H01M 50/264* (2021.01)
  *H01M 50/291* (2021.01)

(52) U.S. Cl.
  CPC ..... *H01M 10/625* (2015.04); *H01M 10/6555* (2015.04); *H01M 50/218* (2021.01); *H01M 50/264* (2021.01); *H01M 50/291* (2021.01); *H01M 2220/20* (2013.01)

(56) References Cited

U.S. PATENT DOCUMENTS

| | | | | |
|---|---|---|---|---|
| 2011/0159348 | A1* | 6/2011 | Park | H01M 50/20 |
| | | | | 429/151 |
| 2012/0094161 | A1 | 4/2012 | Zheng | |
| 2013/0034754 | A1 | 2/2013 | Michelitsch et al. | |
| 2014/0038030 | A1 | 2/2014 | Goesmann | |
| 2018/0294452 | A1* | 10/2018 | Tan | H01M 10/613 |
| 2020/0212389 | A1 | 7/2020 | Kuroiwa et al. | |

FOREIGN PATENT DOCUMENTS

| | | | |
|---|---|---|---|
| CN | 102668226 | A | 9/2012 |
| CN | 103378319 | A | 10/2013 |
| CN | 102386449 | B | 2/2015 |
| CN | 105449132 | B | 3/2016 |
| CN | 205282524 | U | 6/2016 |
| CN | 205282525 | U | 6/2016 |
| CN | 105762316 | A | 7/2016 |
| CN | 206628519 | U | 11/2017 |
| CN | 207233914 | U | 4/2018 |
| CN | 208014836 | U | 10/2018 |
| CN | 106654450 | B | 3/2019 |
| CN | 109742281 | A | 5/2019 |
| CN | 209087957 | U | 7/2019 |
| CN | 209104210 | U | 7/2019 |
| CN | 110137400 | A | 8/2019 |
| CN | 110190218 | A | 8/2019 |
| CN | 209249528 | U | 8/2019 |
| CN | 209249567 | U | 8/2019 |
| CN | 209328987 | U | 8/2019 |
| CN | 209496928 | U | 10/2019 |
| CN | 209896152 | U | 1/2020 |
| CN | 110993845 | A | 4/2020 |
| CN | 111009629 | A | 4/2020 |
| EP | 1117138 | A1 | 7/2001 |
| EP | 2518813 | A2 | 10/2012 |
| EP | 3460867 | A1 | 3/2019 |
| EP | 3534429 | A1 | 9/2019 |
| JP | 2012525665 | A | 10/2012 |
| JP | 2014517995 | A | 7/2014 |
| JP | 2015232922 | A | 12/2015 |
| JP | 2018156825 | A | 10/2018 |
| JP | 2019046578 | A | 3/2019 |
| KR | 101403384 | B1 | 6/2014 |
| KR | 20190096730 | A | 8/2019 |
| WO | 2016049450 | A1 | 3/2016 |
| WO | 2018/186566 | A1 | 10/2018 |
| WO | 2019044801 | A1 | 4/2020 |

OTHER PUBLICATIONS

Recommendations on the Transport of Dangerous Goods, Manual of Tests and Criteria, 6th revised edition, Amendment 1, United Nations, New York and Geneva, 2017, 38 pages.

Samsung SDI 94 Ah Battery Cell Full Specifications, Apr. 5, 2018, 10 pages, retrieved from URL: https://pushevs.com/2018/04/05/samsung-sdi-94-ah-battery-cell-full-specifications/.

EVE Energy Co., Ltd Product Specification, File No. LF105-73103, Version A, Oct. 17, 2017, 14 pages.

* cited by examiner

BATTERY PACK AND ELECTRIC VEHICLE

CROSS-REFERENCE TO RELATED APPLICATIONS

This application is a National Phase Application of International Patent Application No. PCT/CN2020/122891, filed on Oct. 22, 2020, which is based on and claims priority to and benefits of Chinese Patent Application No. 201911129785.1 filed on Nov. 18, 2019 and entitled "BATTERY PACK AND ELECTRIC VEHICLE". The entire content of all of the above-identified applications is incorporated herein by reference.

FIELD

This application belongs to the field of batteries, and more specifically, to a battery pack and an electric vehicle.

BACKGROUND

A power battery pack currently applied to electric vehicles mainly includes a pack body and multiple battery modules mounted in the pack body. The battery module includes a cell array formed by sequentially arranged multiple cells, side plates arranged on two sides of the cell array, and end plates arranged at two ends of the cell array. The side plates and the end plates are connected by screws or a pull rod or through welding, to fix the cell array. After assembly, the battery modules are mounted in the pack body through fasteners such as screws. In addition, to improve the strength of the battery pack, a reinforcing beam is generally required to be arranged in the battery pack. Due to the addition of structural members such as the end plates, the side plates, the reinforcing beam, and the fasteners, the weight of the entire battery pack is relatively large, and the utilization of the internal space of the pack body is reduced. As a result, energy density of the power battery pack cannot meet the demand of users for battery life of the electric vehicles. In addition, this structure has a cumbersome assembly process and complicated assembly procedures. The cells need firstly to be assembled into a battery module and then the battery module is mounted in the pack body, thereby increasing labor, materials, and other costs.

To resolve the problem, the prior art patent with patent No. of CN201822274851.1 provides a battery module, including a first battery module, a second battery module, and a liquid cooling plate. Each of the first battery module and the second battery module includes multiple cells arranged along a horizontal direction, and each cell in the battery module is laid flat (that is, two large opposing faces of the cell are arranged along a vertical direction). The liquid cooling plate is arranged between the first battery module and the second battery module along the vertical direction, and two side surfaces of the liquid cooling plate are respectively bonded with the first battery module and the second battery module by a heat conductive adhesive. Although the battery module omits the structural members for mounting and fixing the cells, which simplifies the assembly process, the overall structural strength of the battery module is relatively low. In addition, to ensure a cooling effect of the liquid cooling plate, an accommodating cavity for accommodating cooling liquid is provided inside the liquid cooling plate, and the accommodating cavity requires a certain thickness. However, the liquid cooling plate of such structure has a relatively low strength and cannot bear excessive structural force to avoid damage to the liquid cooling plate, which results in the outflow of the cooling liquid and short-circuiting of the cell. Therefore, the liquid cooling plate cannot play a role of strengthening and supporting in the battery module.

SUMMARY

This application aims to provide a battery pack with a simple structure, convenient assembly, a relatively high structural strength, relatively high space utilization and energy density and an electric vehicle.

A first aspect of this application provides a battery pack, including: a housing provided with a bottom surface and a top surface; and a battery assembly arranged in the housing. The battery assembly includes a cell sequence and a structural reinforcing member. The cell sequence includes multiple cells. At least some of the cells in the cell sequence are connected by the structural reinforcing member. An outer surface of the cell includes a bottom surface, a top surface, and lateral surfaces. The bottom surface of the cell faces the bottom surface inside the housing. The top surface of the cell faces the top surface inside the housing. The lateral surfaces include first lateral surfaces and two opposing second lateral surfaces. The first lateral surface is defined as a surface having a largest area among the entire outer surfaces of the cell. The cells in the battery assembly are arranged sequentially. Second lateral surfaces of two adjacent cells are oppositely arranged. An arrangement direction of the cells is a first direction. The structural reinforcing member is fixedly bonded with the first lateral surfaces of the cells connected with the structural reinforcing member. A size of the structural reinforcing member is T1 along a second direction, and T1 ranges from 0.5 mm to 5 mm. The first direction is perpendicular to the second direction. The battery assembly abuts with the bottom surface of the housing to be supported in the housing.

In some implementations of this application, in the cell sequence, a quantity of cells connected with the structural reinforcing member is not less than half of a quantity of cells included in the cell sequence.

In some implementations of this application, in the cell sequence, odd-numbered cells or even-numbered cells along the first direction are connected with the structural reinforcing member.

In some implementations of this application, the structural reinforcing member is fixedly bonded with a first lateral surface of each cell in the cell sequence.

In some implementations of this application, the lateral surface includes two opposing first lateral surfaces. Two structural reinforcing members are respectively arranged on two sides of the cell sequence. One structural reinforcing member is fixedly bonded with a first lateral surface on one side of each cell in the cell sequence, and another structural reinforcing member is fixedly bonded with a first lateral surface on another side of each cell in the cell sequence.

In some implementations of this application, the structural reinforcing members are fixedly bonded with a part of the first lateral surfaces of the cells at two ends of the cell sequence along the first direction.

In some implementations of this application, the cell has a largest size along the first direction.

In some implementations of this application, the battery assembly extends from one side of the housing to another side of the housing along the first direction.

In some implementations of this application, the first lateral surfaces of all the cells in the battery assembly are arranged in a same plane.

In some implementations of this application, a surface of the structural reinforcing member bonded with the cell sequence is defined as a first surface. A surface of the cell sequence bonded with the structural reinforcing member is defined as a second surface. The first surface is matched with the second surface.

In some implementations of this application, the structural reinforcing member is a rectangular plate.

In some implementations of this application, the structural reinforcing member is an L-shape plate. A "|" part of the L-shaped plate is attached to and fixedly connected with the first lateral surfaces of the cells in the cell sequence.

In some implementations of this application, a "-" part of the L-shaped plate is attached to and fixedly connected with the bottom surfaces of the cells in the cell sequence. In some implementations of this application, the structural reinforcing member is a "["-shaped plate. The cell sequence is arranged in the "["-shaped plate. A "|" part of the "["-shaped plate is attached to and fixedly connected with the first lateral surfaces of the cells in the cell sequence.

In some implementations of this application, two "-" parts of the "["-shaped plate are respectively attached to the top surfaces of the cells and the bottom surfaces of the cells in the cell sequence.

In some implementations of this application, an area of each of the two "-" parts of the "["-shaped plate ≤ an area of a bottom surface or a top surface of the cell sequence.

In some implementations of this application, a structural adhesive is arranged between the structural reinforcing member and a first lateral surface of each cell in the cell sequence.

In some implementations of this application, the structural reinforcing member includes a metal plate.

In some implementations of this application, the battery pack has an X direction, a Y direction, and a Z direction that are perpendicular to each other. The bottom surface in the housing is opposite to the top surface in the housing along the Z direction. The battery pack includes multiple battery assemblies. The multiple battery assemblies are arranged along the X direction. The first direction is parallel to the Y direction. The second direction is parallel to the X direction.

In some implementations of this application, the cell is a rough cuboid and includes a length L, a height H, and a thickness D, L is greater than D, and L is greater than H. A length direction of the cell extends along the Y direction. A height direction of the cell extends along the Z direction. A thickness direction of the cell extends along the X direction. The structural reinforcing member is the rectangular plate and includes a thickness T1. A length direction of the rectangular plate extends along the Y direction. A thickness direction of the rectangular plate extends along the X direction.

In some implementations of this application, the thickness of the cell is 10 mm to 90 mm.

In some implementations of this application, the cell includes six surfaces, which are respectively the bottom surface and the top surface that are parallel to each other, two parallel first lateral surfaces, and two parallel second lateral surfaces. The two parallel first lateral surfaces are opposite to each other along the thickness direction of the cell.

In some implementations of this application, cells in one battery assembly of at least two adjacent battery assemblies and cells in another battery assembly of the at least two adjacent battery assemblies are arranged in a misaligned manner.

In some implementations of this application, a quantity of cells in one battery assembly of the at least two adjacent battery assemblies is greater than a quantity of cells in the other battery assembly of the at least two adjacent battery assemblies.

In some implementations of this application, a reinforcing block is arranged in the other battery assembly. The reinforcing block is bonded with the second lateral surface of the cell in the battery assembly, to form the cell sequence.

In some implementations of this application, lengths of the two adjacent battery assemblies are equal.

In some implementations of this application, a gap is provided between two adjacent cell sequences, and a battery cooling air duct is formed in the gap.

In some implementations of this application, the gap is provided between the two adjacent cell sequences, and a cooling plate is arranged in the gap.

In some implementations of this application, the battery assembly includes a first end and a second end oppositely arranged along the Y direction. The housing includes a first side frame and a second side frame oppositely arranged along the Y direction. The battery assembly is arranged between the first side frame and the second side frame. The first end of the battery assembly is supported on the first side frame, and the second end of the battery assembly is supported on the second side frame.

In some implementations of this application, a first supporting step is arranged on the first side frame, and a second supporting step is arranged on the second side frame. The first end of the battery assembly is supported on the first supporting step, and the second end of the battery assembly is supported on the second supporting step.

In some implementations of this application, the housing includes a third side frame and a fourth side frame oppositely arranged along the X direction. Multiple battery assemblies are arranged between the third side frame and the fourth side frame in parallel along the X direction.

In some implementations of this application, one battery assembly is arranged in the housing along the Y direction.

In some implementations of this application, a reinforcing plate is arranged between the at least two adjacent battery assemblies.

In some implementations of this application, the reinforcing plate is fixedly bonded with the battery assemblies at two sides of the reinforcing plate.

In some implementations of this application, a thickness of a structural reinforcing member of at least one battery assembly is 10 mm to 35 mm.

In some implementations of this application, the housing includes a tray and an upper cover. An accommodating space is jointly defined by the tray and the upper cover, and the battery assembly is arranged in the accommodating space. The bottom surface of the cell in the battery assembly is fixedly bonded with an inner surface of the tray, and the top surface of the cell is fixedly bonded with an inner surface of the upper cover.

In some implementations of this application, in the cell sequence, the bottom surfaces of the multiple cells are fixedly bonded with an inner surface of the tray, and the top surfaces of the multiple cells are fixedly bonded with an inner surface of the upper cover.

In some implementations of this application, the tray and/or the upper cover is a multi-layer composite structure. The multi-layer composite structure includes two aluminum plate layers and a steel plate or a foamed aluminum plate sandwiched between the two aluminum plate layers.

In some implementations of this application, the tray and/or the upper cover is the multi-layer composite structure. The multi-layer composite structure includes two fiber composite layers and a foamed material layer sandwiched between the two fiber composite layers.

In some implementations of this application, the fiber composite layer includes a glass fiber layer and/or a carbon fiber layer.

In some implementations of this application, an electrode terminal of the cell in the battery assembly is arranged on the top surface of the cell.

In some implementations of this application, the battery pack further includes a battery management system.

According to another aspect, this application further provides an electric vehicle, including the battery pack.

Compared with the related art, beneficial effects of this application are as follows: in this application, multiple cells are connected into a whole, that is, a battery assembly, by a structural reinforcing member. The battery assembly has a relatively large size and a relatively high strength, and the battery assembly is supported on a housing and can play a supporting role. The battery assembly may be used as a cross beam or a longitudinal beam to strengthen a structural strength of the housing, so that less cross beams and/or longitudinal beams are used in the battery pack, and even the cross beam and/or the longitudinal beam can be omitted in the battery pack. That is, the structural strength of the battery pack can be ensured by replacing the cross beam and/or the longitudinal beam with the battery assembly, to ensure that the battery pack is not easily deformed under the action of an external force. Therefore, space occupied by the cross beams and/or the longitudinal beams in the housing is reduced, space utilization of the housing is improved, and more cells can be arranged in the housing as much as possible, thereby increasing the capacity, the voltage, and the battery life of the entire battery pack.

In addition, compared with existing battery modules, the battery assembly in this application reduces the use of end plates. Since the cross beam and/or the longitudinal beam are/is not required to be arranged in the battery pack, on the one hand, a manufacturing process of the battery pack is simplified, the assembly complexity of the cell is reduced, and the production costs are reduced, and on the other hand, a weight of the entire battery pack is reduced, thereby achieving a light weight of the battery pack. In particular, when the power battery pack is mounted on an electric vehicle, the endurance capacity of the electric vehicle may be improved, and the electric vehicle is light-weighted.

Additional aspects and advantages of this application will be given in the following description, some of which will become apparent from the following description or may be learned from practices of this application.

BRIEF DESCRIPTION OF THE DRAWINGS

The accompanying drawings are provided for further understanding of this application and constitute a part of the specification, and explain this application together with the following specific implementations, but do not constitute a limitation to this application. In the accompanying drawings.

REFERENCE NUMERALS

Figure 1:
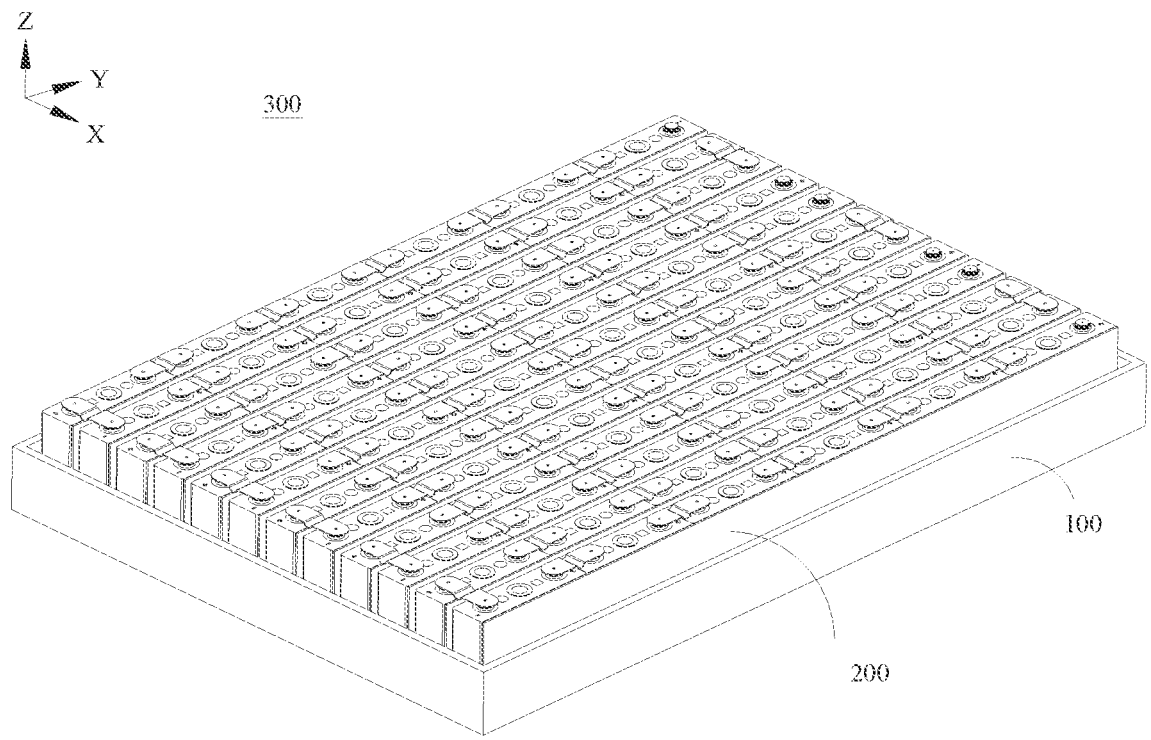
FIG. 1 is a schematic structural diagram of a battery pack according to an embodiment of this application.

Housing 100; Bottom surface of the housing 101; First side frame 103; Second side frame 104; First supporting step 107; Third side frame 111; Fourth side frame 112; Battery assembly 200; Cell sequence 201; Structural reinforcing member 202; Cell 203; Bottom surface of the cell 204; Top surface of the cell 205; First lateral surface 206; Second lateral surface 207; First plate surface 208; Second plate surface 210; Third plate surface 209; Fourth plate surface 211; Fifth plate surface 212; Structural adhesive 213; First end 214; Second end 215; Electrode terminal 216; Battery connecting plate 217; Reinforcing block 218; Battery pack 300; Length of the cell L; Thickness of the cell D; and Height of the cell H.

DETAILED DESCRIPTION

Embodiments of this application are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary and used only for explaining this application, and should not be construed as a limitation on this application.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application.

Figure 3:
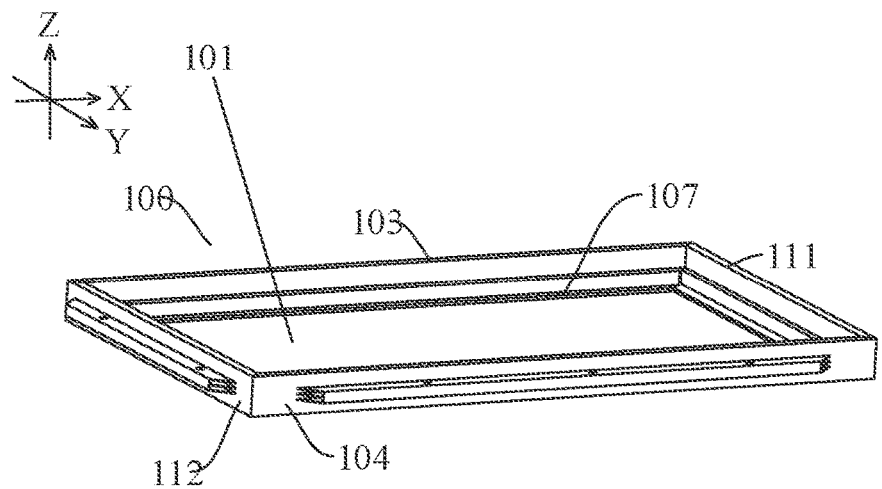
FIG. 3 is a schematic structural diagram of a housing according to an embodiment of this application.

As shown in FIG. 1 and FIG. 3, a battery pack 300 is provided in the application, which includes a housing 100 provided with a bottom surface 101 of the housing and a top surface of the housing, and a battery assembly 200 arranged in the housing 100. The battery assembly 200 includes a cell sequence 201 and a structural reinforcing member 202. The cell sequence 201 includes multiple cells 203, and at least some of the cells 203 in the cell sequence 201 are connected by the structural reinforcing member 202.

An outer surface of the cell 203 includes a bottom surface, a top surface, and lateral surfaces. The bottom surface 204 of the cell faces the bottom surface in the housing 100, and the top surface 205 of the cell faces the top surface in the housing 100. The lateral surfaces includes first lateral surfaces 206 and two opposing second lateral surfaces 207. The first lateral surface 206 is defined as a surface having a largest area among the entire outer surfaces of the cell 203. The cells 203 in the battery assembly 200 are arranged sequentially. Second lateral surfaces 207 of two adjacent cells 203 are oppositely arranged. An arrangement direction of the cells 203 is a first direction. The structural reinforcing member 202 is fixedly bonded with the first lateral surfaces 206 of the cells 203 connected with the structural reinforcing member 202. The battery assembly 200 abuts with the bottom surface of the housing 100 to be supported in the housing 100.

In this application, the housing 100 is provided with the bottom surface 101 of the housing and the top surface (opposite to the bottom surface 101 of the housing and not shown in the figure) of the housing. The bottom surface 101 of the housing and the top surface of the housing herein refer to two opposing surfaces of the housing 100 along a height direction. In some specific embodiments, the housing 100 includes a bottom plate and a sealing cover. An accommodating cavity for accommodating cells is defined by the bottom plate and the sealing cover. The bottom surface 101 of the housing is defined as an inner surface of the bottom plate, and the top surface of the housing 100 is defined as an inner surface of the sealing cover.

In this application, a shape of the cell 203 is not limited. The cell 203 may be in various shapes, which may be a regular geometric shape or an irregular geometric shape, for example, may be a square, a circle, a polygon, a triangle, or may be in any shape for example, be a specially shaped battery. It may be understood that the shape of the cell 203 is not limited in this application.

In this application, the multiple cells 203 are arranged to form the cell sequence 201. A strength between two adjacent cells 203 is generally relatively weak. The cell sequence 201 is fixedly bonded with the structural reinforcing member. The structural reinforcing member 202 is bonded with a lateral surface with the largest area of the cell 203, to ensure the area of a bonding surface, thereby ensuring a structural strength of the bonding surface.

In this application, the structural reinforcing member may be bonded with the cell sequence 201 by a structural adhesive. In this case, the structural adhesive is preferably a structural adhesive with a heat conductive function. During bonding, the heat can also be conducted to the outside of the battery. During assembly of the existing battery module, multiple cells 203 are first arranged with large surfaces (surfaces with a largest area) thereof facing each other to form a cell sequence 201, and side plates are also arranged on two sides of the cell sequence along an arrangement direction of the cells 203. In this assembly manner, the multiple cells 203 are arranged with the large surfaces thereof facing each other. However, in this application, in the cell sequence 201, the multiple cells 203 are arranged with second lateral surfaces 207 (small surfaces) with a relatively small area thereof facing each other to form the cell sequence 201. That is, the cells are arranged with "small surfaces" thereof facing each other. The two arrangement manners are compared, and the arrangement manner in this application is more beneficial to improving the overall structural strength of the battery assembly 200.

In some implementations of this application, a size of the battery assembly 200 ranges from 400 mm to 2500 mm along a first direction. In some other implementations, the size of the battery assembly 200 ranges from 600 mm to 2500 mm along the first direction.

In the related art, for example, in the patent No. of CN201822274851.1, although multiple cells in the battery module are arranged with small surfaces thereof facing each other, the multiple cells 203 are arranged horizontally (two large surfaces respectively face a bottom surface and a top surface).

When an action force is applied to a battery pack along a Z direction (a height direction), a first lateral surface with a largest area of the cell is most likely to deform. If a structural reinforcing member is horizontally placed (the cell is horizontally placed), and when the action force is applied to the battery pack along the Z direction, the force along the Z direction is more likely cause bending of the structural reinforcing member along a thickness direction of a battery assembly, and the cell is also likely to deform along the thickness direction. To prevent the deformation of the structural reinforcing member and the cell, the following solutions are generally available.

1. A bottom plate of the battery pack is made thick, but the weight of the battery pack is increased, reducing weight energy density of the battery pack.

2. A bottom plate of a tray is designed as a hollow structure. The arrangement of a reinforcing structure in the cavity may reduce the weight of the battery pack, but inevitably increase the processing difficulty and design difficulty of the tray. In addition, a height of the tray is increased, reducing volume energy density of the battery pack.

3. A reinforcing rib is arranged on the bottom plate of the tray, the cells are assembled into a battery module, and then the battery module is fixed to the reinforcing rib. To meet a mounting requirement of the battery module, a thickness of the reinforcing rib is generally 10 mm to 20 mm, which occupies a space of the battery pack and reduces volume utilization of the battery pack.

In this application, in the cell sequence 201, the cells 203 are arranged vertically (the large surface is not in contact with the bottom surface or the top surface). In this case, the structural reinforcing member is arranged along a height direction of the pack body and a strength of the structural reinforcing member is larger, which can increase a structural strength of the entire cell sequence 201. When an action force is applied to the battery assembly 200 along a Z direction, the force along the Z direction is more likely to cause bending of the structural reinforcing member 202 along a thickness direction of the battery assembly 200. However, due to a close connection between the structural reinforcing member and the cells and support and protection actions of four side frames of a tray, deformation of the structural reinforcing member 202 along the thickness direction and deformation of the first lateral surface 206 of the cell 203 are greatly prevented, to ensure the reliability of the battery along the thickness direction.

In this application, a size of the structural reinforcing member 202 along a second direction and a weight of the cell are defined as 0.15 mm·kg-1<T1/G<7 mm·kg-1, and T1 ranges from 0.5 mm to 5 mm, which can not only meet a strength requirement of the entire battery assembly, but also minimize the size of the structural reinforcing member. The size of the structural reinforcing member is obviously less than the thickness (10 mm to 20 mm) of the reinforcing rib in the related art.

In some preferred implementations, the dimension T1 of the structural reinforcing member along the second direction and the weight G of the cell meet a relation: 0.25 mm·kg-1≤T1/G≤5.8 mm·kg-1.

In related arts, a cell has a relatively small size and cannot play the role of self-support. In this application, multiple cells 203 are connected by a structural reinforcing member 202 to form a battery assembly 200 with a size of 400 mm to 2500 mm or 600 mm to 2500 mm. The multiple cells 203 as a whole have a structural strength far greater than a strength of any single cell 203. Since the battery assembly 200 is long enough, two ends of the battery assembly 200 can be directly supported on the bottom surface 101 of the housing, that is, the battery assembly 200 replaces a reinforcing structure to ensure a structural strength of the battery pack 300, so that less cross beams and/or longitudinal beams are used in the battery pack 300, and even the cross beam and/or the longitudinal beam can be omitted in the battery pack 300, thereby reducing space occupied by the cross beam and/or the longitudinal beam in the battery pack 300, improving the space utilization of the battery pack 300, enabling as many cells 203 as possible to be arranged inside the battery pack 300, and further improving the capacity, the voltage, and the battery life of the entire battery pack 300.

In this application, the battery assembly 200 abutting with the bottom surface 101 of the housing may be that the battery assembly 200 is in a direct contact with the bottom surface 101 of the housing to support the battery assembly 200 or may be that the battery assembly 200 is in an indirect contact with or connected with the bottom surface 101 of the housing, which may be arranged by those skilled in the art according to a specific working condition and is not limited in this application.

In an implementation of this application, in the cell sequence 201 formed by sequentially arranging the multiple cells 203, first lateral surfaces 206 of all the cells 203 may be connected with the structural reinforcing member 202, or first lateral surfaces 206 of some of the cells 203 may be connected with the structural reinforcing member 202. That is, the multiple cells 203 in the cell sequence 201 are sorted into two groups. One group is fixedly bonded with the structural reinforcing member 202, and another group is not fixedly bonded with the structural reinforcing member 202. To make the overall structural strength of the battery assembly 200 relatively high, a quantity of cells 203 connected with the structural reinforcing member 202 is not less than half of the quantity of cells 203 included in the cell sequence 201.

It should be noted that, when the first lateral surfaces 206 of some of the cells 203 in the cell sequence 201 are connected with the structural reinforcing member 202, the cells 203 may be consecutively arranged in the cell sequence 201 or may be spaced. That is, the cells 203 connected with the structural reinforcing member 202 and the cells 203 that are not connected with the structural reinforcing member 202 are cross-arranged to form the cell sequence 201.

In some specific implementations, the odd-numbered cells 203 or the even-numbered cells 203 in the cell sequence 201 are connected with the structural reinforcing member 202. In this application, there may be multiple first lateral surfaces 206. In some implementations, the lateral surface includes two opposing first lateral surfaces 206. Two structural reinforcing members 202 are respectively arranged on two sides of the cell sequence 201. One structural reinforcing member 202 is fixedly bonded with a first lateral surface 206 on one side of each cell 203 in the cell sequence 201, and another structural reinforcing member 202 is fixedly bonded with a first lateral surface 206 on another side of each cell 203 in the cell sequence 201. The structural reinforcing members 202 are arranged on two opposing sides of the cell sequence 201, to further improve the strength of the battery assembly 200.

Figure 4:
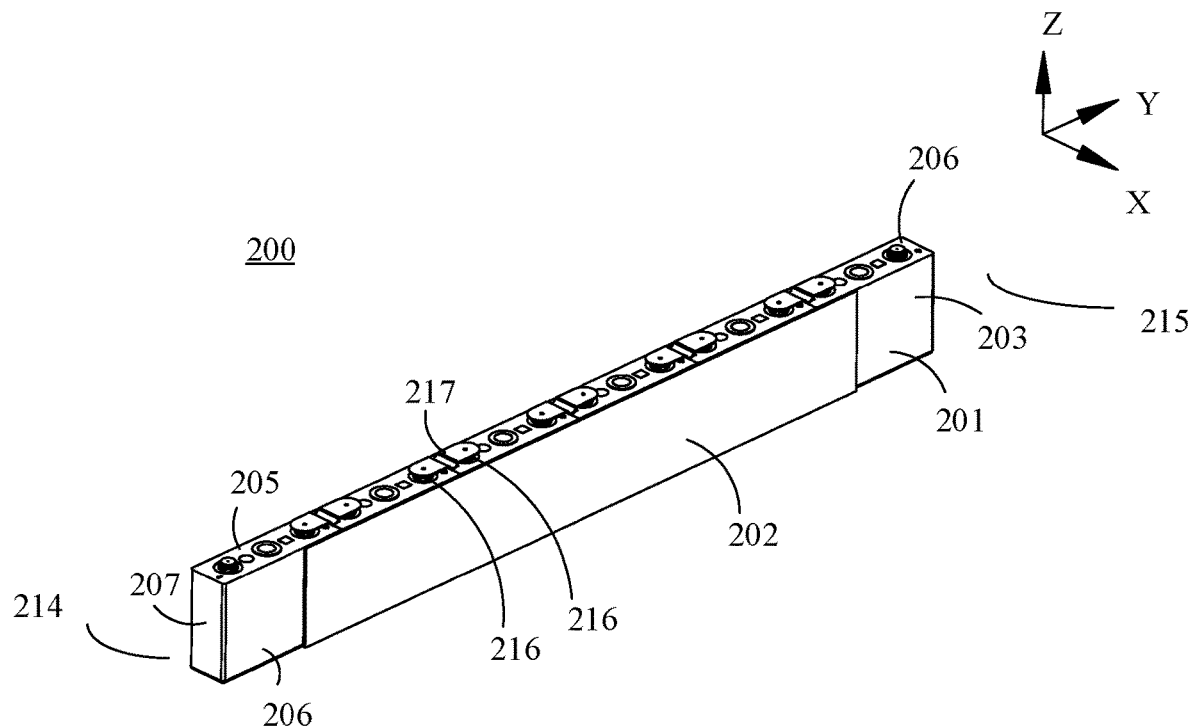
FIG. 4 is a schematic structural diagram in which a cell sequence is connected with a structural reinforcing member according to an embodiment of this application.
Figure 5:
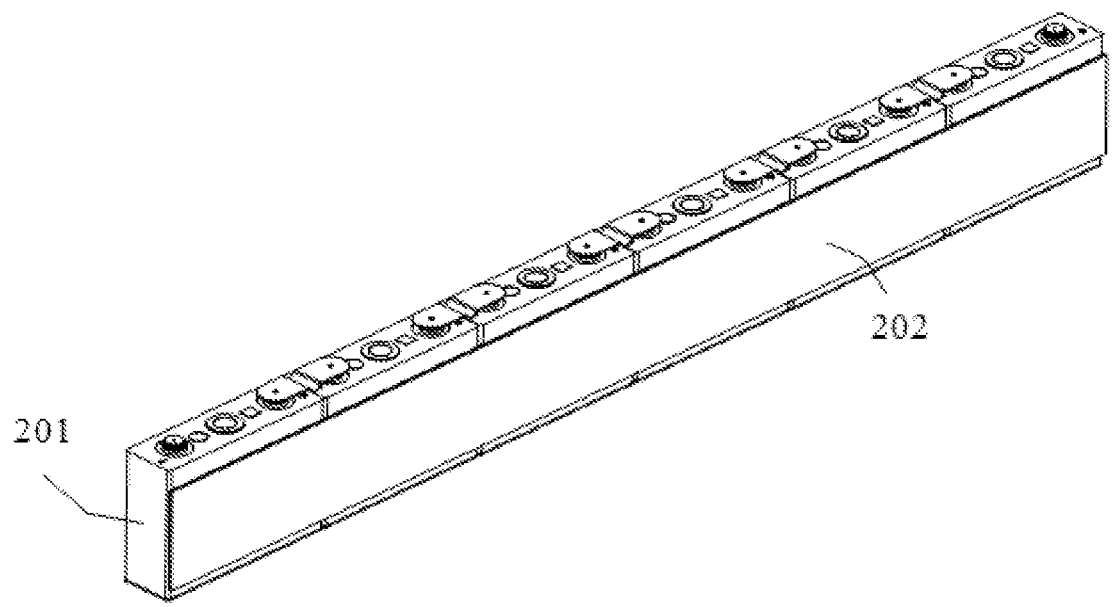
FIG. 5 is a schematic structural diagram in which a cell sequence is connected with a structural reinforcing member according to another embodiment of this application.

In this application, the entire region of the first lateral surfaces 206 of the cells 203 may be bonded with the structural reinforcing members 202, or a partial region of the first lateral surfaces 206 of some of the cells 203 may be bonded with the structural reinforcing member 202. In some implementations, as shown in FIG. 4, since the structural reinforcing member 202 is fixedly bonded with the entire region of the first lateral surfaces 206 of the intermediate cells 203, the structural strength and the stability of the entire battery assembly 200 are still relatively high, and partial regions of the first lateral surfaces 206 of cells 203 at two ends of the cell sequence 201 are bonded with the structural reinforcing member 202, thereby not affecting the overall strength and the stability of the battery assembly 200 and reducing the costs.

In this application, the cell 203 has a largest size along the first direction. Therefore, the battery assembly 200 with a higher strength may be implemented by arranging the fewest cells 203.

It should be noted that an arrangement direction of the cells 203, that is, the first direction, is a direction in which a quantity of the cells 203 increases.

In this application, the battery assembly 200 extends from one side of the housing 100 to another side of the housing 100 along the first direction, that is, when multiple battery assemblies 200 are arranged in the housing 100, only one battery assembly 200 is arranged along the first direction, and the two or more battery assemblies 200 are not accommodated. Only a single battery assembly 200 is arranged along the first direction, to facilitate a compact stacking of the multiple cells 203.

In this application, the first lateral surfaces 206 of the multiple cells 203 in the cell sequence 201 are arranged in a same plane, so that it is more reliable that the structural reinforcing member 202 can be fixedly bonded with the first lateral surfaces 206 of all the cells 203, and the stability and the strength of the battery assembly 200 are also higher.

In this application, a shape of the structural reinforcing member 202 is not specially limited, provided that the structural reinforcing member can have a specific structural strength and can increase the structural strength of the battery assembly 200 when connecting the multiple cells 203 into a whole. In addition, the structural reinforcing member is not easily deformed.

In some implementations, a surface of the structural reinforcing member 202 bonded with the cell sequence 201 is defined as a first surface. A surface of the cell sequence 201 bonded with the structural reinforcing member 202 is defined as a second surface. The first surface is matched with the second surface.

It should be noted that, in this application, the matching refers that the first surface of the structural reinforcing member 202 can be attached to the second surface of the cell sequence 201, so that the structural reinforcing member 202 can play a role of strengthening and fixing, the shape and the area of the structural reinforcing member 202 are not specially limited. In some specific implementations, the first surface of the structural reinforcing member 202 and the second surface of the cell sequence 201 have a same shape and are arranged correspondingly. The shapes of the first surface and the second surface are the same, so that the structural reinforcing member 202 can be more easily attached to the cell sequence 201.

Certainly, the shapes of the first surface and the second surface may be different. For example, when the cells 203 in the cell sequence 201 are all rectangular cells with a cuboid structure (the cell sequence 201 is also cuboid shaped), and the structural reinforcing member 202 is a rectangular plate, for example, when the strength of the battery pack 300 meets a requirement or there is a specific requirement on an assembly space of the battery assembly 200 in the housing 100, all the cells 203 in the cell sequence 201 are connected into a whole by the structural reinforcing member 202, and the strength of the battery assembly 200 can be ensured. An area of the structural reinforcing member 202 may be less than an area of the second surface of the cell sequence 201. For example, a length of the rectangular structural reinforcing member 202 is less than a length of the cell sequence 201, and a width of the structural reinforcing member 202 is less than a width of the cell sequence 201. In this case, a length of the battery assembly 200 is the length of the cell sequence 201, a width of the battery assembly 200 is the width of the cell sequence 201, and a thickness of the battery assembly 200 is a thickness of the cell sequence 201.

Certainly, in some embodiments, the area of the structural reinforcing member 202 may be greater than the area of the second surface of the cell sequence 201. For example, the length of the rectangular structural reinforcing member 202 is greater than the length of the cell sequence 201, and the width of the structural reinforcing member 202 is greater than the width of the cell sequence 201.

In some embodiments of this application, the structural reinforcing member 202 is a rectangular plate.

In some embodiments of this application, the structural reinforcing member 202 is an L-shaped plate. The "|" part of the L-shaped plate is attached to and fixedly connected with the first lateral surfaces 206 of the cells 203 in the cell sequence 201.

Figure 9:
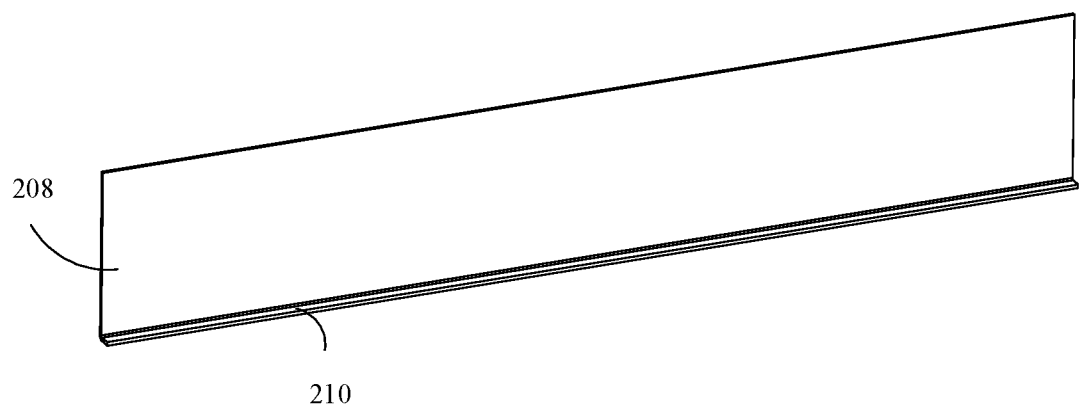
FIG. 9 is a schematic structural diagram of a structural reinforcing member according to another embodiment of this application.

In some embodiments of this application, as shown in FIG. 9, a lateral surface of the "|" part of the L-shaped plate attached to the first lateral surfaces 206 of the cells 203 in the cell sequence 201 is defined as a first plate surface 208, and a lateral surface of the cell sequence 201 attached to the first plate surface 208 is defined as a third surface. The first plate surface 208 and the third surface have a same shape and are arranged correspondingly.

In some embodiments of this application, the "-" part of the L-shaped plate is attached to and fixedly connected with the bottom surfaces 204 of the cells in the cell sequence 201.

A surface of the "-" part of the L-shaped plate attached to the bottom surfaces 204 of the cells in the cell sequence 201 is defined as a second plate surface 210, and a surface of the cell sequence 201 attached to the second plate surface 210 is defined as a fourth surface. The second plate surface 210 and the fourth surface have a same shape and an equal area and are arranged correspondingly.

The arrangement not only simplifies the structure of the housing 100 greatly, but also improves the space utilization of the battery pack 300 and the energy density of the battery pack 300. In addition, all the cells 203 in the cell sequence 201 may be connected into a whole by the structural reinforcing member 202, to improve the strength of the battery assembly 200 and reduce a space occupied by the reinforcing rib in the battery pack 300, thereby further reducing the weight of the battery pack 300.

In some embodiments of this application, the structural reinforcing member 202 is a "["-shaped plate, and the cell sequence 201 is arranged in the "["-shaped plate. The "|" part of the "["-shaped plate is attached to and fixedly connected with the first lateral surfaces 206 of the cells 203 in the cell sequence 201.

In some embodiments of this application, a lateral surface of the "|" part of the "["-shaped plate attached to the first lateral surfaces 206 of the cells 203 in the cell sequence 201 is defined as a third plate surface 209, and a lateral surface of the cell sequence 201 attached to the third plate surface 209 is defined as a seventh surface. The third plate surface 209 and the seventh surface have a same shape and an equal area and are arranged correspondingly.

In some embodiments of this application, two "-" parts of the "["-shaped plate are respectively attached to the top surfaces 205 of the cells and the bottom surfaces 204 of the cells in the cell sequence 201.

In some embodiments of this application, an area of each of the two "-" parts of the "["-shaped plate ≤ an area of a bottom surface or a top surface of the cell sequence.

In some embodiments of this application, a surface of the "["-shaped plate attached to the bottom surfaces 204 of the cells in the cell sequence 201 is defined as a fourth plate surface 211, and a surface of the cell sequence 201 attached to the fourth plate surface 211 is defined as a fifth surface. The fourth plate surface 211 and the fifth surface have a same shape and an equal area and are arranged correspondingly.

In some embodiments of this application, a surface of the "["-shaped plate attached to the top surfaces of the cells 203 in the cell sequence 201 is defined as a fifth plate surface 212, and a surface of the cell sequence 201 attached to the fifth plate surface 212 is defined as a sixth surface. The fifth plate surface 212 is a rectangle, and an area of the rectangle is less than an area of the sixth surface. The arrangement not only simplifies the structure of the housing 100 greatly, but also improves the space utilization of the battery pack 300 and the energy density of the battery pack 300. In addition, all the cells 203 in the cell sequence may be connected into a whole by the structural reinforcing member 202, to improve the strength of the battery assembly 200 and reduce a space occupied by the reinforcing rib in the battery pack 300, thereby further reducing the weight of the battery pack 300.

Figure 6:
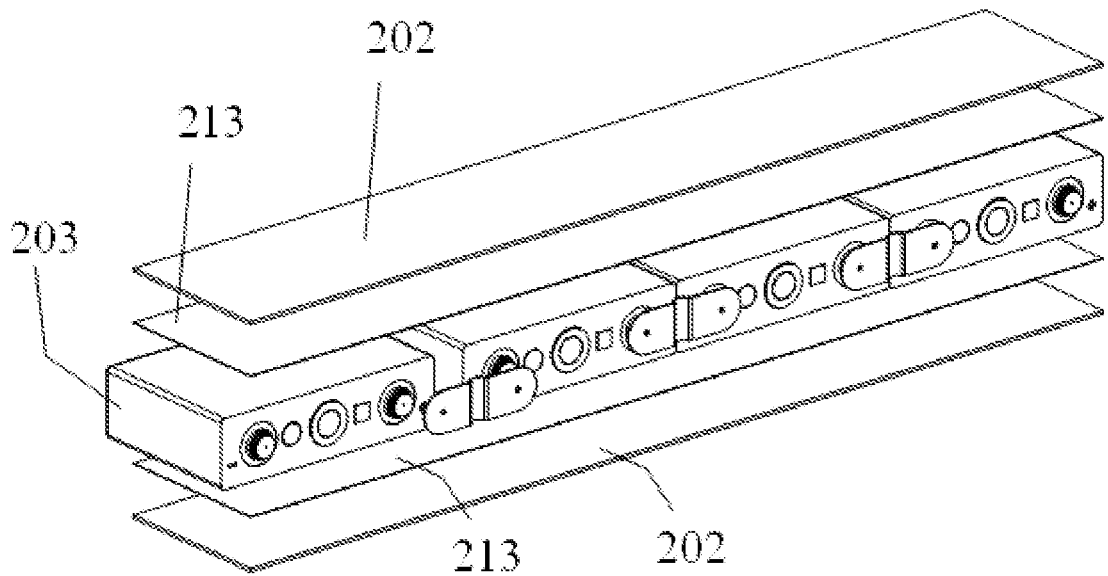
FIG. 6 is a schematic exploded view of a battery assembly according to an embodiment of this application.

In some embodiments of this application, as shown in FIG. 6, a structural adhesive 213 is arranged between the structural reinforcing member 202 and a first lateral surface 206 of each cell 203 in the cell sequence 201, that is, the cell 203 is bonded with the structural reinforcing member 202 by the structural adhesive 213.

Preferably, the structural adhesive 213 is a heat conductive structural adhesive 213. The heat conductive structural adhesive 213 can not only ensure a good bonding effect between the structural reinforcing member 202 and the first lateral surface 206 of the cell 203, but also conduct heat generated by the cell 203 during operation. Preferably, a thickness of the heat conductive structural adhesive 213 is 0.5 mm to 20 mm.

In some embodiments of this application, the structural reinforcing member 202 is a metal plate. For example, the metal plate may be a steel plate or an aluminum plate, and the metal plate has a high structural strength and good heat dissipation performance. In some embodiments of this application, a thickness of the metal plate is 0.8 mm to 3.5 mm. Preferably, the thickness of the metal plate is 1 mm to 2.5 mm. When the structural reinforcing member 202 is too thin, the structural strength of the battery assembly 200 is affected. When the structural reinforcing member 202 is too thick, the weight and space in the battery pack 300 are occupied, which is not conducive to the design of the battery pack 300.

In some implementations of the present invention, the battery pack 300 has an X direction, a Y direction, and a Z direction that are perpendicular to each other. The bottom surface 101 in the housing is opposite to the top surface in the housing along the Z direction. The battery pack 300 includes multiple battery assemblies 200, and the multiple battery assemblies 200 are arranged along the X direction. The first direction is parallel to the Y direction, and the second direction is parallel to the X direction.

In this application, the X direction, the Y direction, and the Z direction indicate orientations only but do not limit a specific shape of the housing 100.

In some implementations of this application, the cell is a rough cuboid and includes a length L, a height H, and a thickness D, L is greater than D, and L is greater than H. A length direction of the cell 203 extends along the Y direction. A height direction of the cell extends along the Z direction. A thickness direction of the cell extends along the X direction. The structural reinforcing member is a rectangular plate and a size of the structural reinforcing member along the second direction is the thickness T1. A length direction of the rectangular plate extends along the Y direction. A thickness direction of the rectangular plate extends along the X direction.

In this implementation, when the cell 203 is a cuboid and the structural reinforcing member 202 is the rectangular plate, the length of the battery assembly 200 is the size of the battery assembly 200 mentioned above along the first direction. The thickness of the rectangular plate is the dimension T1 of the structural reinforcing member 202 mentioned above along the second direction.

In this implementation, the cell 203 is roughly a cuboid structure. It may be understood that the cell 203 may be a cuboid, a cube, or a rough cuboid or a cube having a special shape locally; or may present an approximate cuboid or cube as a whole, but partially have a gap, a bulge, a chamfer, an arc, and a curve.

In this implementation, the structural reinforcing member 202 is roughly a rectangular plate. It may be understood that the structural reinforcing member 202 may be a cuboid, a cube, or a rough cuboid or a cube having a special shape locally; or may present an approximate cuboid or cube as a whole, but partially have a gap, a bulge, a chamfer, an arc, and a curve.

In this implementation, to facilitate more stable bonding between the structural reinforcing member 202 and the cell 203 and achieve a longer service life, the thickness T1 of the structural reinforcing member and the thickness D of the cell satisfies a relation: $T1/D > 0.012$, and more preferably, $0.4 \leq T1/D \leq 0.9$. The inventor of this application finds through a large quantity of experiments that when the thickness T1 of the structural reinforcing member and the thickness D of the cell meet the foregoing relation, the battery pack can meet a requirement on vibration and extrusion performance of the Chinese standard GB/T31467.3-2015.

In some specific implementations, the thickness of the cell is 10 mm to 90 mm. Therefore, a bonding strength between the structural reinforcing member and the cell is higher.

In this implementation, the cell 203 has six surfaces, which are respectively the bottom surface and the top surface that are parallel to each other, two parallel first lateral surfaces 206, and two parallel second lateral surfaces 207. The two parallel first lateral surfaces 206 are opposite to each other along the thickness direction of the cell 203.

In this implementation, the first lateral surface 206 of the cell 203 is a surface formed along a length direction and a width direction thereof (the first lateral surface 206 includes two opposing surfaces). The second lateral surface 207 of the cell 203 is a surface formed along the length direction and a thickness direction thereof (the second lateral surface 207 also includes two opposing surfaces), and both the bottom surface 204 and the top surface of the cell are surfaces formed along the width direction and the thickness direction thereof.

The cells 203 in the cell sequence 201 are all set to rectangular cells of a cuboid structure, which is convenient for the structural reinforcing member 202 to be attached to and fixedly connected with the first lateral surfaces 206 of each cell 203 in the cell sequence 201, and all the cells 203 in the cell sequence 201 are connected into a whole with rectangular shape by the structural reinforcing member 202, which simplifies the assembly process. In addition, the cuboid-shaped battery assembly 200 may better serve as a reinforcing beam in the housing 100, to reduce the use of reinforcing ribs in the housing 100. This not only helps to reduce the weight of the entire battery pack 300, but also greatly simplifies the structure of the housing 100, thereby helping to improve the space utilization of the battery pack 300 and the energy density of the battery pack 300.

It should be noted that, the shapes of the multiple cells 203 included in the cell sequence 201 may be the same or different. For example, although all the cells 203 in the cell sequence 201 may be rectangular cells of a cuboid structure, the sizes (the lengths L, the heights H, and the thicknesses D) of the cells 203 in the cell sequence 201 may also be different from each other. The size of each cell 203 may be flexibly set and selected according to actual requirements.

To further improve the strength of the entire battery pack, in some implementations of this application, cells 203 in one battery assembly 200 of at least two adjacent battery assemblies 200 and cells 203 in another battery assembly 200 of the at least two adjacent battery assemblies are arranged in a misaligned manner.

Figure 12:
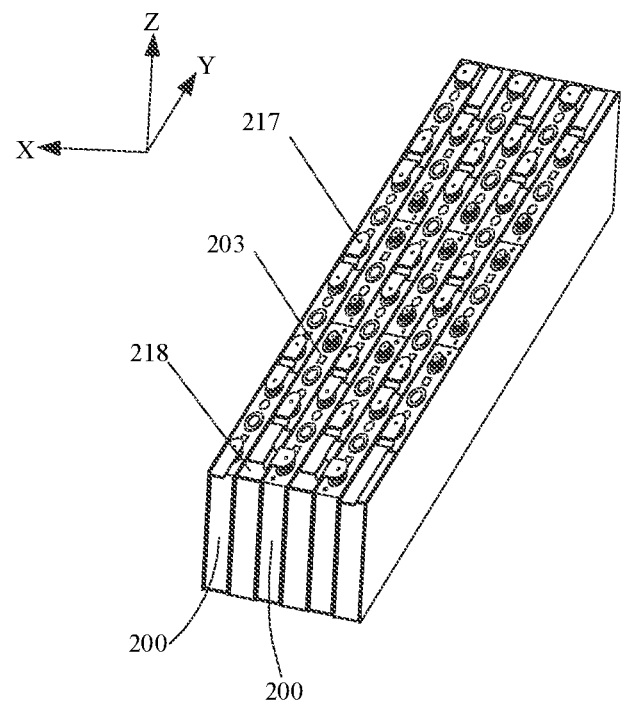
FIG. 12 is another schematic structural diagram in which multiple battery assemblies are stacked according to this application.
Figure 13:
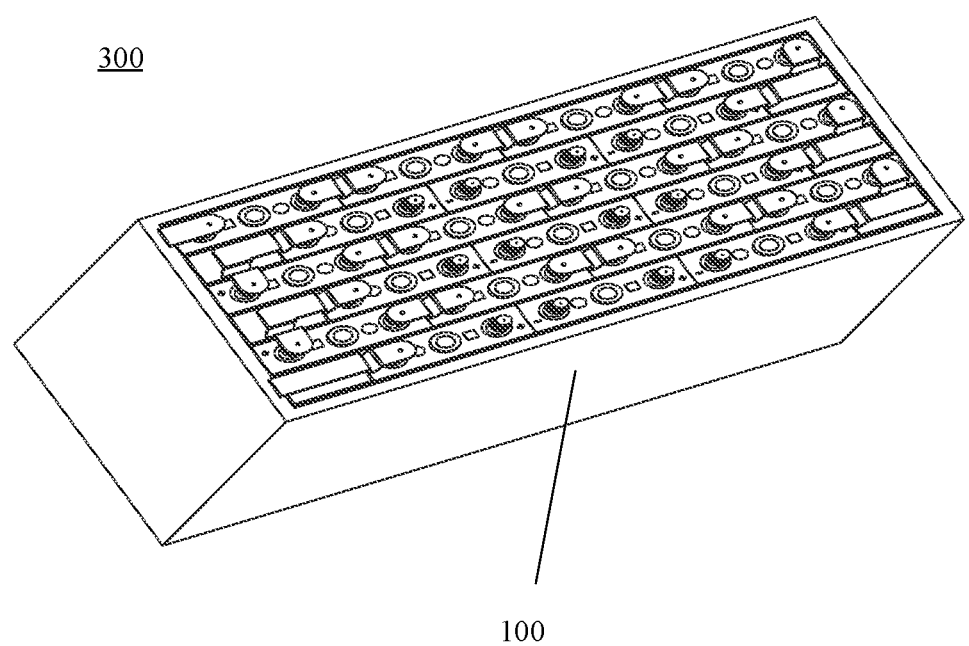

In this application, as shown in FIG. 12 and FIG. 13, cells 203 in two adjacent battery assemblies 200 are placed in a misaligned manner along a direction.

It should be noted that, the misaligned arrangement makes second lateral surfaces 207 of the contact surfaces between cells 203 are not on a same straight line. Therefore, in one battery assembly 200, weak points between the cells 203 and the cells 203 can be balanced by another battery assembly 200. Once an external force is applied to the battery pack, the weak points are not highly susceptible to failure.

In this implementation, the misaligned arrangement may be understood that all cells 203 in two adjacent battery assemblies 200 are arranged in a misaligned manner or some of the cells 203 in two adjacent battery assemblies 200 are arranged in a misaligned manner. In an embodiment, cells 203 in each two adjacent battery assemblies 200 may be arranged in a misaligned manner or cells 203 in battery assemblies 200 that are spaced may be arranged in a misaligned manner.

Specifically, six battery assemblies are arranged in the battery pack. Conditions are as follows.

(1) Cells 203 in a first battery assembly and cells in a second battery assembly are arranged in a misaligned manner, the cells in the second battery assembly and cells 203 in a third battery assembly are arranged in a misaligned manner. Cells in the third battery assembly and cells 203 in a fourth battery assembly are arranged in a misaligned manner. Cells in the fourth battery assembly and cells 203 in a fifth battery assembly are arranged in a misaligned manner. Cells in the fifth battery assembly and cells 203 in a sixth battery assembly are arranged in a misaligned manner.

(2) Cells 203 in the first battery assembly and cells in the second battery assembly are arranged in an aligned manner. Cells in the second battery assembly and cells 203 in a third battery assembly are arranged in an aligned manner. Cells in the third battery assembly and cells 203 in a fourth battery assembly are arranged in an aligned manner. Cells in the fourth battery assembly and cells 203 in a fifth battery assembly are arranged in an aligned manner. Cells in the fifth battery assembly and cells 203 in a sixth battery assembly are arranged in an aligned manner.

(3) Cells 203 in a first battery assembly and cells in a second battery assembly are arranged in a misaligned manner. Cells in the second battery assembly and cells 203 in a third battery assembly are arranged in an aligned manner. Cells in the third battery assembly and cells 203 in a fourth battery assembly are arranged in a misaligned manner. Cells in the fourth battery assembly and cells 203 in a fifth battery assembly are arranged in an aligned manner. Cells in the fifth battery assembly and cells 203 in a sixth battery assembly are arranged in a misaligned manner.

In other words, in this implementation, cells 203 in some of adjacent battery assemblies are arranged in an aligned manner, and cells 203 in other adjacent battery assemblies are arranged in a misaligned manner. In an embodiment, cells 203 in all adjacent battery assemblies are arranged in a misaligned manner.

To implement misaligned arrangement, sizes of cells 203 in two adjacent battery assemblies 200 that are arranged in a misaligned manner may not be equal.

To ensure the consistency of the cells 203, the cells 203 of a same size are adopted. Therefore, to implement misaligned arrangement, a quantity of cells 203 in one battery assembly 200 of at least two adjacent battery assemblies 200 is greater than a quantity of cells 203 in another battery assembly 200 of the at least two adjacent battery assemblies.

Specifically, if a quantity of cells 203 in a battery assembly 200 is n (n>1 and n is an integer), the battery assembly 200 is denoted as a battery assembly A, and a quantity of cells 203 in another battery assembly 200 is at most n−1, and is denoted as a battery assembly B. As shown in FIG. 12, the battery assemblies A and the battery assemblies B are arranged, to form a structure of ABAB . . . or AABBAA . . . . Finally, as shown in FIG. 13, after the battery assemblies 200 are arranged, the housing 100 is arranged outside, to form the battery pack 300. In the design, the cells 203, and the cell 203 and the housing 100 are bonded by the structural adhesive. A glue pouring is preferably used to form a whole inside the battery pack 300.

Figure 11:
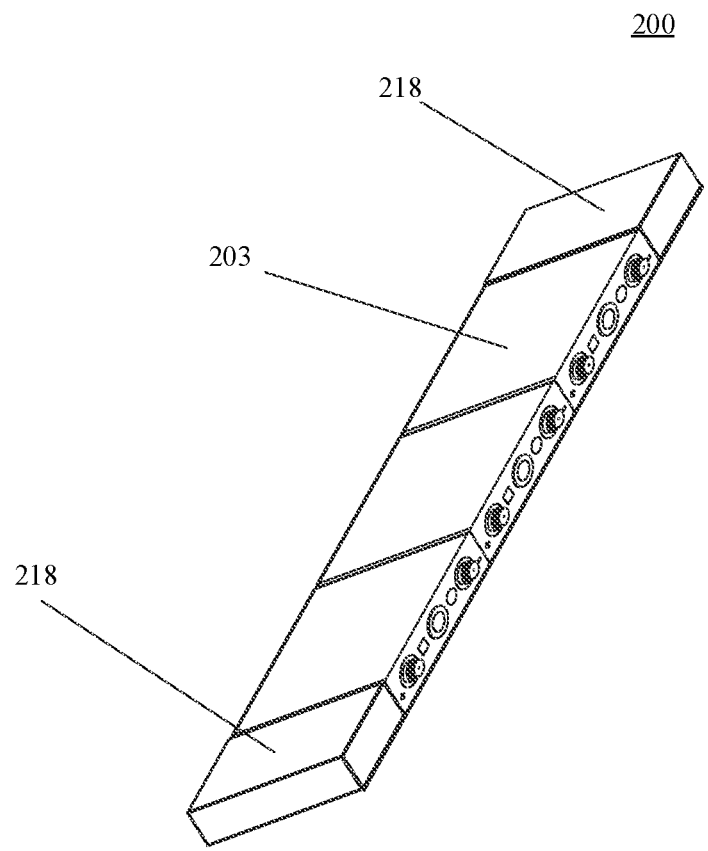
FIG. 11 is a schematic structural diagram of another battery assembly according to this application.

In the implementations, when quantities of cells 203 in two adjacent battery assemblies 200 are not equal, a length of one battery assembly 200 with a relatively small quantity of cells 203 is less than that of the other battery assembly 200. To ensure the overall strength of the battery pack 300, as shown in FIG. 11, a reinforcing block 218 is arranged in the battery assembly 200. The reinforcing block 218 is bonded with a second lateral surface 207 of the cell 203 in the battery assembly 200, to form the cell sequence 201, thereby ensuring an equal length of the two adjacent battery assemblies 200 and high overall strength of the battery pack.

In the implementation, a specific position of the reinforcing block 218 in the battery assembly 200 is not specially limited. The reinforcing block may be arranged at one end of the battery assembly 200 or may be arranged between two adjacent cells 203 in the battery assembly 200. A quantity of reinforcing blocks 218 is not limited, and there may be one or more reinforcing blocks. Multiple reinforcing blocks 218 may be spaced between the cells 203 or may be arranged together.

In the implementation, for example, in the structure of ABAB . . . , a cell sequence 201 between two structural reinforcing members 202 and the structural reinforcing members 201 form a firm "I"-shaped structure, and three adjacent battery assemblies 200 form another "I"-shaped structure. The overall strength of the battery pack 300 is increased through the densely distributed "I"-shaped structures. With this structure, the thickness of the structural reinforcing member 201 can be greatly reduced, which can support the structural strength of the entire battery pack 300 and form a cellular structure. Meanwhile, since the interior of the battery pack 300 is not a solid body, a small amount of space can also absorb an impact force caused by extreme situations such as impact. The battery pack 300 of this structure is arranged at the bottom of a vehicle, which can well support a structural strength of the whole vehicle and reduce a strength design of the whole vehicle, thereby reducing the design costs, difficulty, and the cycle of the whole vehicles.

In some embodiments of the application, a gap exists between two adjacent cell sequences 201. A battery cooling air duct 410 is formed in the gap. Certainly, the gap also serves to accommodate the expansion of the cells 203 during operation. In some embodiments of this application, a cooling plate 420 may be arranged in the gap to cool and perform heat dissipation on the cell 203.

In some embodiments of this application, the battery assembly 200 includes a first end 214 and a second end 215 oppositely arranged along the Y direction. The housing 100 includes a first side frame 103 and a second side frame 104 oppositely arranged along the Y direction. The battery assembly 200 is arranged between the first side frame 103 and the second side frame 104. The first end 214 of the battery assembly 200 is supported on the first side frame 103, and the second end 215 of the battery assembly 200 is supported on the second side frame 104. That is, the battery assembly 200 extends between the first side frame 103 and the second side frame 104.

In this embodiment, the first end 214 and the second end 215 of the battery assembly 200 are respectively supported on the first side frame 103 and the second side frame 104. The battery assembly 200 may be directly supported by the first side frame 103 and the second side frame 104, that is, is placed on the first side frame 103 and the second side frame 104, or may further be fixed to the first side frame 103 and the second side frame 104. A specific fixing manner is described in detail below, and the specific support and fixing manners are not limited in this application.

Under the technical concept of this application, in an embodiment, a distance between the first side frame 103 and the second side frame 104 is matched with the size of the battery assembly 200 along the Y direction. The matching herein indicates that an interval between two side frames or two side walls described below can be matched with mounting of one battery assembly 200. The matching may be various matching methods such as interval matching, interference matching, fastening matching, and fixing matching to achieve an object of this application.

In some embodiments of this application, the first end 214 of the battery assembly 200 may be directly or indirectly supported on the first side frame 103, and the second end 215 of the battery assembly 200 may be directly or indirectly supported on the second side frame 104. The direct support indicates that the first end 214 of the battery assembly 200 is in direct contact with the first side frame 103 for support and matching, and the second end 215 of the battery assembly 200 is in direct contact with the second side frame 104 for fitting. The indirect supporting indicates that, for example, in some embodiments, the first end 214 of the battery assembly 200 is matches with and is supported by the first side frame 103 through a first end plate 214, and the second end 215 of the battery assembly 200 is matched with and is supported by the second side frame 104.

In addition, compared with the related art, the battery assembly 200 provided in this application extends between the first side frame 103 and the second side frame 104, and two ends of the battery assembly 200 are respectively supported on the first side frame 103 and the second side frame 104, so that the battery assembly 200 serves as a cross beam and/or a longitudinal beam for reinforcing the structural strength of the housing 100. In other words, a reinforcing structure is not required to be arranged in the housing 100 to reinforce the structural strength of the housing, and as a substitution of the reinforcing structure, the battery assembly 200 may be directly used to ensure the structural strength of the housing 100, thereby ensuring that the housing 100 is easily deformed under the action of an external force. In addition, in a case of a constant volume, since the cell 203 in the related art has a relatively small size and a relatively short length, two opposing ends of the cell 203 cannot be matched with two side frames oppositely arranged in the housing 100, and the cell 203 cannot play a supporting role.

In some embodiments of this application, the first side frame 103 is provided with a first supporting step 107, and the second side frame 104 is provided with a second supporting step (not shown). The first end 214 of the battery assembly 200 is supported on the first supporting step 107, and the second end 215 of the battery assembly 200 is supported on the second supporting step 108.

There are multiple battery assemblies 200, and the multiple battery assemblies 200 are arranged in parallel along the X direction. The multiple battery assemblies 200 are directly arranged in the housing 100 in parallel. Structural members for mounting and fixing the cell 203 is omitted in such design, which is not only beneficial to the weight reducing of the entire battery pack 300, but also simplifies the assembly process and is beneficial to lowering the production costs.

It should be noted that, when there are multiple battery assemblies 200, a shape and a size of each battery assembly 200 and a shape and a quantity of cells 203 in each battery assembly 200 may be the same or may be different. For example, when all the cells 203 in multiple cell sequences 201 are rectangular cells of a cuboid structure, quantities of cells 203 and the sizes (the lengths l, the widths h, and the thicknesses d) of the cells 203 in the multiple battery assemblies 200 may also be different from each other. The sizes of the cells 203 may be flexibly set and selected according to actual requirements.

In some embodiments of this application, as shown in FIG. 3, the housing 100 includes a third side frame 111 and a fourth side frame 112 oppositely arranged along the X direction. Multiple battery assemblies 200 are arranged in parallel between the third side frame 111 and the fourth side frame 112 along the X direction. In an implementation, the first side frame 103 and the second side frame 104 are perpendicular to and connected with the third side frame 111 and the first side frame 112, so that the housing 100 is formed as a rectangle or a square. In another implementation, the first side frame 103 and the second side frame 104 may be parallel to each other, and the third side frame 111 and the fourth side frame 112 may be arranged at an angle with the first side frame 103 and the second side frame 104, so that the housing 100 is formed as a trapezoid, a parallelogram, or the like. A specific shape of the housing 100 formed by the first side frame 103, the second side frame 104, the third side frame 111, and the fourth side frame 112 is not limited in this application.

In some embodiments of this application, the third side frame 111 applies a force, facing toward the fourth side frame 112, to the battery assembly 200 arranged adjacent to the third side frame 111. The fourth side frame 112 applies a force, facing toward the third side frame 111, to the battery assembly 200 arranged adjacent to the fourth side frame 112, so that multiple battery assemblies 200 can be closely arranged between the third side frame 111 and the fourth side frame 112 along the X direction, and the multiple battery assemblies 200 can be matched with each other. In addition, the third side frame 111 and the fourth side frame 112 may limit the multiple battery assemblies 200 along the X direction. In particular, when a small amount of expansion of the battery assemblies 200 occurs, the battery assemblies 200 can be buffered and provided with inward pressure to prevent an excessive amount of expansion and deformation of the battery assemblies 200.

In particular, when an anti-explosion valve and a current interruption device (CID) are arranged on the battery assembly 200, the third side frame 111 and the fourth side frame 112 can effectively limit the expansion of the battery assembly 200, so that when the battery assembly 200 fails and expands, there is sufficient air pressure inside the battery assembly to break through the anti-explosion valve or the flip sheet within the CID, thereby short-circuiting the battery assembly 200, ensuring safety of the battery assembly 200, and preventing the battery assembly 200 from exploding.

To further improve the overall strength of the battery pack 300, in some implementations of this application, a reinforcing plate is arranged between at least two adjacent battery assemblies 200. The arrangement of the reinforcing plate can better absorb the impacts received by the cell sequence 201 along a three-dimensional direction, and improve the mechanical strength of the entire cell sequence 201.

In this application, the reinforcing plate may be an aluminum plate or a steel plate. A quantity of reinforcing plates is not limited, and there may be one or more reinforcing plates. When multiple reinforcing plates are to be arranged, a reinforcing plate may be arranged between each two adjacent battery assemblies 200, or a reinforcing plate may be arranged between some of the adjacent battery assemblies 200.

To facilitate a compact stacking of the cells 203 in the entire battery pack 300, in some implementations of this application, a shape of the reinforcing plate may be roughly similar to a shape of the cell 203. The reinforcing plate is fixedly bonded with the battery assemblies 200 arranged on two sides, to improve the overall structure of the entire battery pack 300.

To improve the overall strength of the battery pack 300, in some other implementations of this application, the thickness of the structural reinforcing member 202 of at least one battery assembly 200 may be directly thickened. In some specific implementations, the thickness of the structural reinforcing member of at least one battery assembly ranges from 10 mm to 35 mm.

Compared with a thickness of 0.5 mm to 3.5 mm of another structural reinforcing member, through thickening, on the one hand, multiple cells 203 are connected by a structural reinforcing member 202, which can strengthen the battery pack 300, and the structural reinforcing member 202 can also play a role in strengthening the structure of the battery pack 300. The double strengthening effect makes the overall mechanical strength of the battery pack 300 higher.

In this application, the housing 100 includes a tray and an upper cover. An accommodating space is jointly defined by the tray and the upper cover, and the battery assembly 200 is arranged in the accommodating space.

In this application, bottom surfaces 204 of multiple cells are fixedly bonded with an inner surface of the tray, and top surfaces 205 of the multiple cells are fixedly bonded with an inner surface of the upper cover. The bottom surfaces and the top surfaces of the multiple cells 203 are respectively bonded with inner surfaces of the housing 100, and the battery pack 300 may be designed as an integrated structure. Such an integrated design is to design the battery pack 300 as a structural member with great rigidity, so that the rigidity and strength of the battery pack 300 are greatly improved, and the mechanical safety and reliability are improved. During use, the structural strength of the integrated battery pack 300 is used as a part of the structural strength of the whole vehicle. Contrary to the existing design idea, the battery pack may be used to enhance the structural strength of the whole vehicle without the need for the whole vehicle to protect the battery pack. This design can simplify or even cancel the design structure of the whole vehicle frame to protect the structural strength of the battery pack, implement a lightweight design requirement for the whole vehicle, reduce the design and manufacturing costs of the whole vehicle, and improve the production efficiency of the whole vehicle.

In the present invention, the inner surface is a surface close to one side of the cell 203.

It should be noted that, the top surfaces 205 of the multiple cells may be directly fixedly bonded with the inner surface of the upper cover or may be indirectly fixedly bonded with the inner surface of the upper cover.

In some implementations of this application, the upper cover and/or the tray may be a multi-layer composite structure, which can make the battery pack better withstand the impacts of the whole vehicle and improve the structural strength.

For example, in some specific implementations, the multi-layer composite structure includes two aluminum plate layers and a steel plate or a foamed aluminum plate sandwiched between the two aluminum plate layers. That is, the multi-layer composite structure is an aluminum plate/foamed aluminum plate/aluminum plate or the multi-layer composite structure is an aluminum plate/steel plate/aluminum plate.

In some other specific implementations, the multi-layer composite structure includes two fiber composite layers and a foamed material layer sandwiched between the two fiber composite layers.

The foamed material layer includes a foamed polymer material, for example, a polyurethane foam or phenolic foam material. By the foamed material layer, a thermal conductivity is low and a good thermal insulation effect can be achieved. In addition, the density of the foam material is low. Compared with the steel plate or aluminum alloy functioning as a sealing cover, the battery pack is lighter.

The fiber composite layer includes a glass fiber layer and/or a carbon fiber layer. That is, the multi-layer composite layer may be a glass fiber layer/foamed material layer/glass fiber layer, a carbon fiber layer/foamed material layer/carbon fiber layer, or a glass fiber layer/foamed material layer/carbon fiber layer. The upper cover and/or the tray of the battery pack is designed into the foamed material layer and fiber composite layers distributed in an inner side and an outer side of the foamed material layer, the fiber layer has high tensile strength and elastic modulus and is not deformed when the internal pressure of the battery pack increases within a specific range, and effectively insulates fire and heat, which improves the safety performance of the battery pack under extreme situations.

Figure 10:
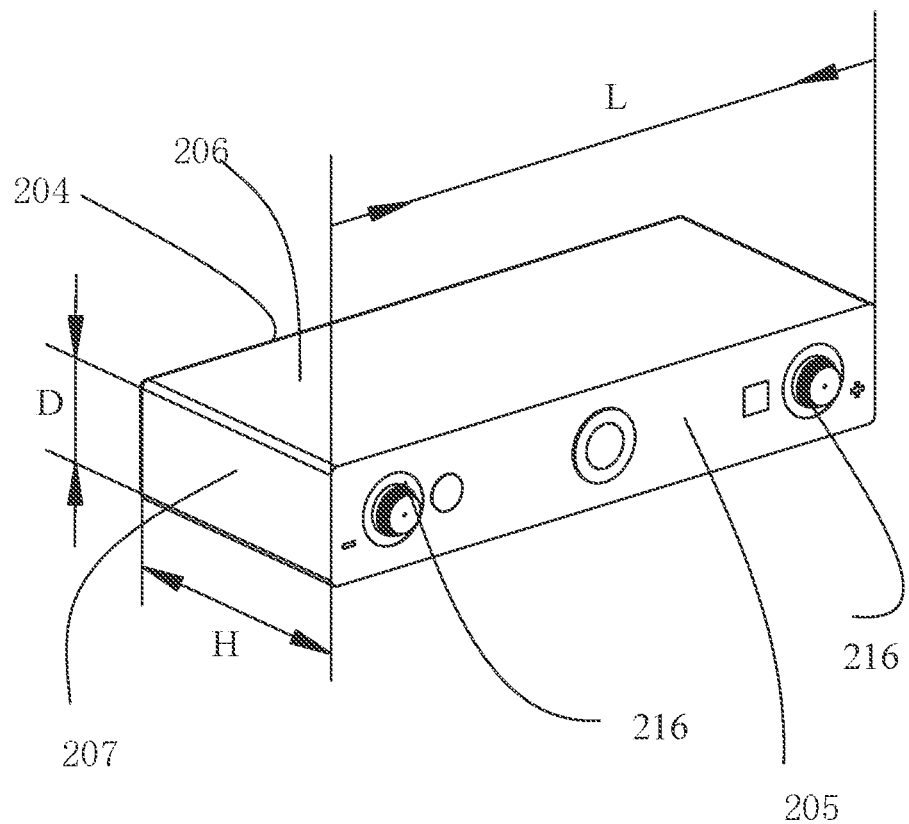
FIG. 10 is a schematic structural diagram of a cell according to this application.

The structural strength of the integrated battery pack may be used as a part of the structural strength of the whole vehicle. The battery pack may be used to enhance the structural strength of the whole vehicle, which simplifies the design structure of the whole vehicle frame to protect the structural strength of the battery pack, implements a lightweight design requirement for the whole vehicle, reduces the design and manufacturing costs of the whole vehicle, and improves the production efficiency of the whole vehicle. As shown in FIG. 4 and FIG. 10, to facilitate the arrangement of the battery assembly 200 in the battery pack 300, electrode terminals 216 of the cells 203 in the battery assembly 200 are arranged on the top surfaces of the cells 203. One of the electrode terminals 216 is a positive electrode terminal, and another is a negative electrode terminal. The electrode terminals 216 of the cells 203 are connected in series or in parallel by a battery connecting plate 217.

In this application, the housing 100 further includes a battery management system.

A second aspect of this application provides an electric vehicle, which includes the battery pack 300. The electric vehicle has strong endurance and low costs.

In the descriptions of this application, it should be noted that, unless otherwise explicitly specified or defined, the terms such as "install", "connect", and "connection" should be understood in a broad sense. For example, the connection, may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in this application according to specific situations.

In description of this specification, description of reference terms such as "an embodiment", "specific embodiments", or "an example", means including specific features, structures, materials, or features described in the embodiment or example in at least one embodiment or example of this application. In this specification, exemplary descriptions of the foregoing terms do not necessarily refer to the same embodiment or example. In addition, the described specific features, structures, materials, or characteristics may be combined in a proper manner in any one or more of the embodiments or examples.

Although the embodiments of this application have been shown and described, a person of ordinary skill in the art is to be understood that various changes, modifications, replacements, and variations may be made to the embodiments without departing from the principles and spirit of this application, and the scope of this application is as defined by the appended claims and their equivalents.

Specific Embodiments 1 to 5

Figure 2:
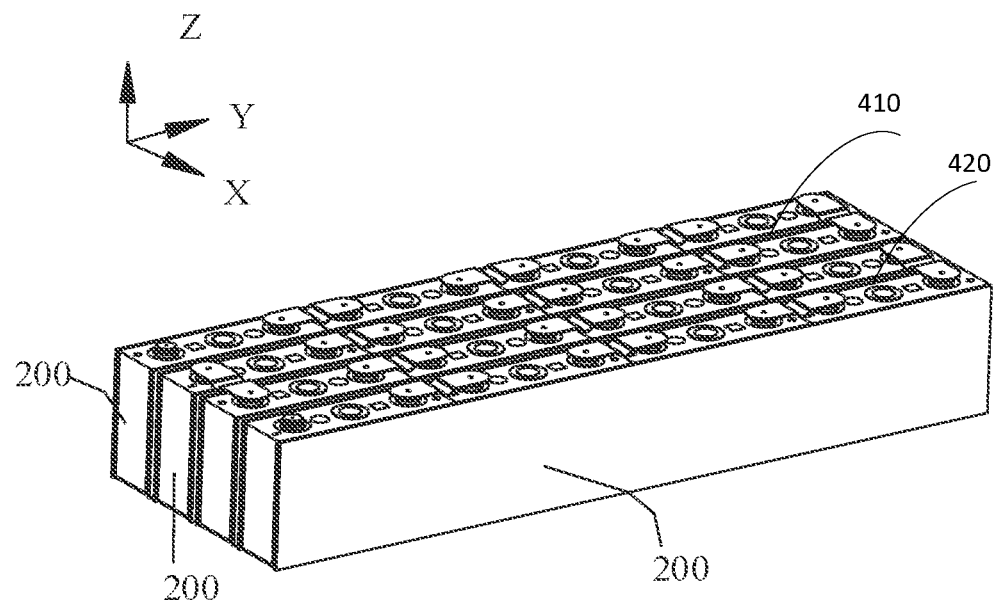
FIG. 2 is a schematic structural diagram of multiple battery assemblies according to an embodiment of this application.

Four cuboid-shaped cells 203 are arranged along a Y direction in a manner shown in FIG. 2, a same side of the surfaces of the four cells 203 are connected with a structural reinforcing member 202. A shape of the structural reinforcing member 202 is a rectangular plate shown in FIG. 4. The four cells 203 are assembled into a battery assembly 200. Such twelfth battery assemblies 200 are arranged along an X direction and placed in a housing 100 shown in FIG. 1, two ends of each battery assembly 200 are supported on a first side frame 103 and a second side frame 104, and then sealed by an upper cover, to form a battery pack. The structural reinforcing member and the cell 203 in this embodiment meet the conditions shown in Table 1. According to Standard No. GB/T 31467.3-2015 "Lithium-ion power battery packs and systems for electric vehicles Part 3: Safety requirements and test methods", a test result is shown in Table 1.

TABLE 1

Test results of anti-vibration and anti-extrusion performance of batteries with different specifications of battery assemblies

| Number | $T_1$ thickness (mm) of a rectangular plate | D thickness (mm) of a cell | G weight (kg) of a cell | $T_1/D$ | $T_1/G(mm*kg-1)$ | Test Result |
|---|---|---|---|---|---|---|
| Embodiment 1 | 0.5 | 80 | 2 | 0.00625 | 0.25 | No fire and no explosion |
| Embodiment 2 | 5 | 10 | 1.2 | 0.5 | 4.166666667 | No fire and no explosion |
| Embodiment 3 | 0.6 | 50 | 3.5 | 0.012 | 0.171428 | No fire and no explosion |
| Embodiment 4 | 4 | 10 | 5 | 0.4 | 0.8 | No fire and no explosion |
| Embodiment 5 | 2 | 10 | 2 | 0.2 | 1 | No fire and no explosion |
| Embodiment 6 | 5 | 13 | 1.2 | 0.384615385 | 4.166666667 | No fire and no explosion |
| Embodiment 7 | 2.9 | 29 | 0.5 | 0.1 | 5.8 | No fire and no explosion |
| Embodiment 8 | 2 | 26.5 | 0.9 | 0.075471698 | 2.222222222 | No fire and no explosion |
| Embodiment 9 | 3 | 37 | 2 | 0.081081081 | 1.5 | No fire and no explosion |
| Embodiment 10 | 4 | 44 | 5 | 0.090909091 | 0.8 | No fire and no explosion |
| Embodiment 11 | 1 | 50 | 1.6 | 0.02 | 0.625 | No fire and no explosion |
| Embodiment 12 | 1 | 70 | 4 | 0.014285714 | 0.25 | No fire and no explosion |
| Embodiment 13 | 3.9 | 39 | 0.6 | 0.1 | 6.5 | No fire and no explosion |
| Embodiment 14 | 4.2 | 90 | 2 | 0.0466666 | 2.1 | No fire and no explosion | four cells are connected by a structural reinforcing member 202 to form a battery assembly 200, and a shape of the structural reinforcing member 202 is a rectangular plate shown in FIG. 4. Such twelfth battery assemblies 200 are arranged along an X direction and placed in a housing 100 shown in FIG. 1, two ends of each battery assembly 200 are supported on a first side frame 103 and a second side frame 104, and then sealed by an upper cover, to form a battery pack. The structural reinforcing member 202 and the cell 203 in each embodiment meet the following conditions. According to Standard No. GB/T 31467.3-2015 "Lithium-ion power battery packs and systems for electric vehicles Part 3: Safety requirements and test methods", a test result is shown in Table 1.

Specific Embodiments 6 to 14

Figure 7:
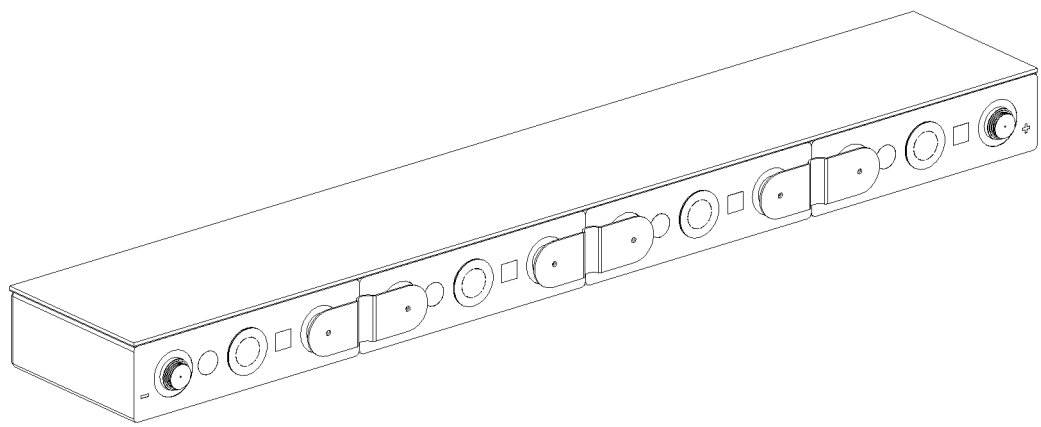
FIG. 7 is a schematic structural diagram in which a cell sequence is connected with a structural reinforcing member according to another embodiment of this application.
Figure 8:
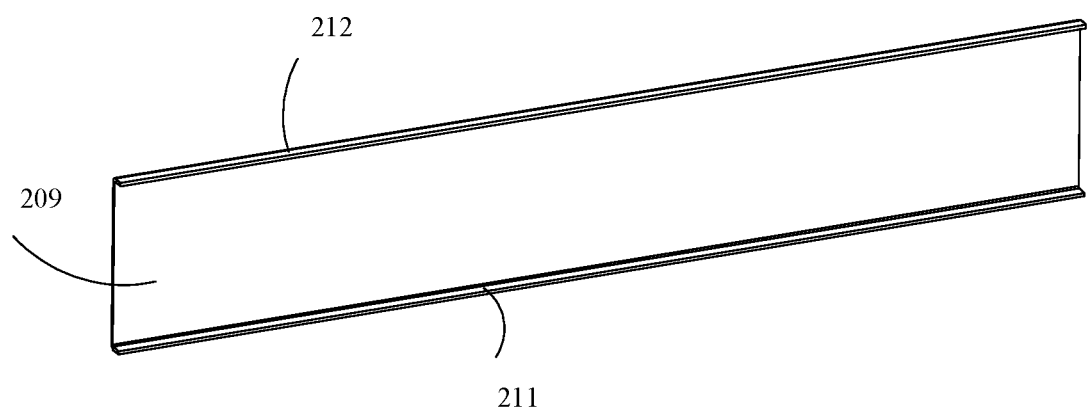
FIG. 8 is a schematic structural diagram of a structural reinforcing member according to an embodiment of this application.

Four cuboid-shaped cells 203 are arranged along a Y direction in a manner shown in FIG. 7, and both two large It can be learned from the test results in the table that the battery pack provided in this application has relatively high strength and can meet the requirements of the anti-vibration and anti-extrusion performance for the battery pack.

What is claimed is:

1. A battery pack, comprising:
   a housing comprising a bottom surface and a top surface; and
   a battery assembly arranged in the housing;
   wherein the battery assembly comprises a cell sequence and a structural reinforcing member; the cell sequence comprises a plurality of cells, and at least some of the cells in the cell sequence are connected by the structural reinforcing member; each of the cells comprises a bottom surface, a top surface, and lateral surfaces; the bottom surface of each cell faces the bottom surface of the housing, and the top surface of each cell faces the top surface of the housing; the lateral surfaces comprise two first lateral surfaces opposite to each other and two second lateral surfaces opposite to each other, and each of the first lateral surfaces has an area greater than an area of the top surface of each cell, an area of the bottom surface of each cell, and an areas of each of the second lateral surfaces of each cell; and the cells in the battery assembly are arranged sequentially along a first direction, and second lateral surfaces of two adjacent cells are arranged facing each other; and the battery assembly abuts the bottom surface of the housing to be supported in the housing, wherein the battery assembly is a first battery assembly, and the battery pack further comprises a second battery assembly adjacent to the first battery assembly, wherein the cells in the cell sequence of the first battery assembly and cells in a cell sequence of the second battery assembly are arranged in a misaligned manner.

2. The battery pack according to claim 1, wherein in the cell sequence of the first battery assembly, a number of cells connected with the structural reinforcing member is not less than half of a total number of the cells in the cell sequence of the first battery assembly.

3. The battery pack according to claim 1, wherein the structural reinforcing member is fixedly coupled with a first lateral surface of each cell in the cell sequence of the first battery assembly.

4. The battery pack according to claim 1, wherein the structural reinforcing member is a first structural reinforcing member, and the battery pack further comprises a second structural reinforcing member, wherein the first structural reinforcing member is fixedly coupled with first lateral surfaces of cells on a first side of the cell sequence of the first battery assembly, and the second structural reinforcing member is fixedly coupled with first lateral surfaces of cells on a second side of the cell sequence of the first battery assembly, wherein the first side is opposite to the second side.

5. The battery pack according to claim 1, wherein the structural reinforcing member is fixedly coupled with a part of first lateral surfaces of cells at two ends of the cell sequence of the first battery assembly along the first direction.

6. The battery pack according to claim 1, wherein the first lateral surfaces of each cell are arranged in parallel with the first direction.

7. The battery pack according claim 1, wherein the battery assembly extends between two sides of the housing along the first direction.

8. The battery pack according claim 1, wherein the structural reinforcing member comprises a rectangular plate.

9. The battery pack according to claim 1, wherein a structural adhesive is arranged between the structural reinforcing member and first lateral surfaces of cells in the cell sequence of the first battery assembly connected with the structural reinforcing member.

10. The battery pack according to claim 1, wherein the structural reinforcing member comprises a metal plate.

11. The battery pack according to claim 1, wherein the battery pack has an X direction, a Y direction, and a Z direction that are perpendicular to each other, and the bottom surface in the housing is opposite to the top surface in the housing along the Z direction; the battery pack comprises a plurality of battery assemblies, and the plurality of battery assemblies are arranged along the X direction; the first direction is parallel to the Y direction; and a second direction is parallel to the X direction.

12. The battery pack according to claim 11, wherein each cell is roughly a cuboid and comprises a length L in the Y direction, a height H in the Z direction, and a thickness D in the X direction, L is greater than D and H; the structural reinforcing member is a rectangular plate and comprises a thickness T1 in the X direction.

13. The battery pack according to claim 12, wherein the thickness D of each cell is from 10 mm to 90 mm inclusive.

14. The battery pack according to claim 12, wherein the first lateral surfaces of each cell are parallel to each other along the X direction, and the second lateral surfaces of each cell are parallel to each other along the Y direction.

15. The battery pack according to claim 12, wherein the thickness T1 is from 10 mm to 35 mm inclusive.

16. The battery pack according to claim 1, further comprising a reinforcing block arranged in the cell sequence of the second battery assembly, wherein the reinforcing block is coupled with a second lateral surface of a cell in the cell sequence of the second battery assembly.

17. The battery pack according to claim 1, wherein a battery cooling air duct is formed in a gap between the cell sequences.

18. The battery pack according to claim 1, further comprising a cooling plate arranged in a gap between the cell sequences.

19. The battery pack according to claim 1, wherein each of the battery assemblies comprises a first end and a second end oppositely arranged, the housing comprises a first side frame and a second side frame oppositely arranged, each of the battery assemblies is arranged between the first side frame and the second side frame of the housing, the first end of the first battery assembly is supported by the first side frame of the housing, and the second end of the first battery assembly is supported by the second side frame of the housing.

20. The battery pack according to claim 19, wherein the first side frame comprises a first supporting step, and the second side frame comprises a second supporting step; and the first end of the first battery assembly is supported on the first supporting step, and the second end of the first battery assembly is supported on the second supporting step.

21. The battery pack according to claim 19, wherein the housing further comprises a third side frame and a fourth side frame oppositely arranged and extending between the first side frame and the second side frame, and the battery assemblies are arranged in parallel between the third side frame and the fourth side frame.

22. The battery pack according to claim 1, wherein a reinforcing plate is arranged between the cell sequences of the adjacent battery assemblies, and is fixedly coupled with the cell sequences.

23. The battery pack according to claim 1, wherein the housing comprises a tray and an upper cover, and the battery assembly is arranged between the tray and the upper cover; and bottom surfaces of the cells in the battery assembly are fixedly coupled with an inner surface of the tray, and top surfaces of the cells are fixedly coupled with an inner surface of the upper cover.

24. The battery pack according to claim 23, wherein the tray and/or the upper cover comprises a multi-layer composite structure, and the multi-layer composite structure comprises two aluminum plates, and a steel plate or a foamed aluminum plate sandwiched between the two aluminum plates.

25. The battery pack according to claim 23, wherein the tray and/or the upper cover comprises a multi-layer composite structure, and the multi-layer composite structure comprises two fiber composite layers and a foamed material layer sandwiched between the two fiber composite layers, wherein each of the two fiber composite layer comprises a glass fiber layer and/or a carbon fiber layer.

26. The battery pack according to claim 1, wherein each of the cells comprises an electrode terminal arranged on the top surface of the cell.

27. The battery pack according to claim 1, wherein the structural reinforcing member is fixedly coupled with the first lateral surfaces of cells connected with the structural reinforcing member, a width of the structural reinforcing member along a second direction is from 0.5 mm to 5 mm inclusive, and the first direction is perpendicular to the second direction.

28. An electric vehicle, comprising a battery pack, wherein the battery pack comprises:
a housing comprising a bottom surface and a top surface; and
a battery assembly arranged in the housing;
wherein the battery assembly comprises a cell sequence and a structural reinforcing member; the cell sequence comprises a plurality of cells, and at least some of the cells in the cell sequence are connected by the structural reinforcing member; each of the cells comprises a bottom surface, a top surface, and lateral surfaces; the bottom surface of each cell faces the bottom surface of the housing, and the top surface of each cell faces the top surface of the housing; the lateral surfaces comprise two first lateral surfaces opposite to each other and two second lateral surfaces opposite to each other, and each of the first lateral surfaces has an area greater than an area of the top surface of each cell, an area of the bottom surface of each cell, and an areas of each of the second lateral surfaces of each cell; and the cells in the battery assembly are arranged sequentially along a first direction, and second lateral surfaces of two adjacent cells are arranged facing each other; and the battery assembly abuts the bottom surface of the housing to be supported in the housing, wherein the battery assembly is a first battery assembly, and the battery pack further comprises a second battery assembly adjacent to the first battery assembly, wherein the cells in the cell sequence of the first battery assembly and cells in a cell sequence of the second battery assembly are arranged in a misaligned manner.

* * * * *